(12) United States Patent
     Obliger

(10) Patent No.: US 11,363,907 B2
(45) Date of Patent: *Jun. 21, 2022

(54) BEVERAGE MACHINE WITH A CONTROLLED CAPSULE PIERCING

(71) Applicant: SOCIETE DES PRODUITS NESTLE S.A., Vevey (CH)

(72) Inventor: Nicolas Obliger, Franey (FR)

(73) Assignee: Societe des Produits Nestle S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/980,146

(22) PCT Filed: Mar. 13, 2019

(86) PCT No.: PCT/EP2019/056267
§ 371 (c)(1),
(2) Date: Sep. 11, 2020

(87) PCT Pub. No.: WO2019/175230
PCT Pub. Date: Sep. 19, 2019

(65) Prior Publication Data
US 2021/0007539 A1    Jan. 14, 2021

(30) Foreign Application Priority Data

Mar. 14, 2018 (EP) .................................. 18161841
Dec. 20, 2018 (EP) .................................. 18214470

(51) Int. Cl.
*A47J 31/36* (2006.01)
*B65D 85/804* (2006.01)

(52) U.S. Cl.
CPC ....... *A47J 31/3628* (2013.01); *A47J 31/3623* (2013.01); *B65D 85/8052* (2020.05)

(58) Field of Classification Search
CPC .... A47J 31/3628; A47J 31/3623; A47J 31/46; A47J 31/3633; A47J 31/3604; A47J 31/407; A47J 31/461; A47J 31/468
(Continued)

(56) References Cited

U.S. PATENT DOCUMENTS

2011/0183055 A1    7/2011  Mariller
2011/0297005 A1*  12/2011  Mariller ............. A47J 31/0678
                                                            99/295
2015/0059588 A1    3/2015  Castellani

FOREIGN PATENT DOCUMENTS

CN           102599816 A    7/2012

OTHER PUBLICATIONS

China Patent Office Communication for Application No. 201980017944.0, dated Feb. 28, 2022, 18 pages.

* cited by examiner

*Primary Examiner* — Phuong T Nguyen
(74) *Attorney, Agent, or Firm* — K&L Gates LLP

(57) ABSTRACT

A machine for preparing a beverage from a capsule includes a capsule extraction seat, an inlet arrangement for guiding water into the seat and a dispensing arrangement for guiding beverage out of the seat. The dispensing arrangement has a face delimiting a downstream part of the seat, the face bearing one or more raised elements that project upstream and that are configured for forming one or more beverage outlet openings in the outlet membrane of the capsule in the seat. The raised element(s) are fixed relative to or integral with the face and include at least one controllable raised element. The face is associated with an opening control arrangement configured to control the formation of the outlet opening(s) in the outlet membrane by the controllable raised (Continued)

element. The opening control arrangement has at least one neutralizing member that is movable between an operative position and a rest position.

16 Claims, 3 Drawing Sheets

(58) Field of Classification Search
USPC ......... 99/275, 280, 281, 285, 286, 287, 290, 99/291, 293, 295, 299, 300
See application file for complete search history.

_US 11,363,907 B2_

BEVERAGE MACHINE WITH A CONTROLLED CAPSULE PIERCING

CROSS REFERENCE TO RELATED APPLICATIONS

The present application is a National Stage of International Application No. PCT/EP2019/056267, filed on Mar. 13, 2019, which claims priority to European Patent Application No. 18161841.4, filed on Mar. 14, 2018 and European Patent Application No. 18214470.9, filed Dec. 20, 2018, the entire contents of which are being incorporated herein by reference.

FIELD OF THE INVENTION

The field of the invention pertains to beverage preparation machines provided with a particular extraction arrangement of capsules containing an ingredient of the beverage to be prepared.

For the purpose of the present description, a "beverage" is meant to include any human-consumable liquid substance, such as tea, coffee, hot or cold chocolate, milk, soup, baby food, etc. . . . A "capsule" is meant to include any pre-portioned beverage ingredient, such as a flavoring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

The preparation of beverage by extraction of an extractible ingredient, such as a brewable ingredient e.g. roast-and-ground coffee and/or tea, in particular contained in a portioned container such as a capsule, a pod or a sachet, is well known.

EP0512468 relates to a capsule with a cup-shaped body and a tearable beverage outlet membrane. The membrane is generally a thin aluminium membrane that tears against a tearing extraction plate of a beverage extracting device such as described in EP0512470.

EP0512470 relates to a system for extracting a coffee using a beverage extraction unit with a tearing extraction plate comprising multiple raised elements and channels in-between (called a "flow grille and relief surface element") which is adapted to receive a sealed capsule, to introduce water under pressure via a water injector into the capsule, to deform the outlet membrane or cover (e.g. an aluminium membrane) and to tear it under the effect of pressure of the liquid rising in the capsule to allow the beverage to be released from the capsule.

EP0602203 relates to a sealed flexible sachet in the form of an individual portion adapted to be extracted under pressure containing at least one powdered substance for the preparation of a beverage such as roast-and-ground coffee; the sachet comprising two identical flexible sheets of circular, oval or polygonal shape, which provide between one another a space for the substance and are sealed over their periphery so that the sachet is substantially symmetrical with respect to its plane of sealing, the sachet being opened under the effect of the increase in pressure in the sachet when the extraction fluid is injected.

EP0870457 relates to an extraction unit similar to as EP0512470, but adapted for a closed impermeable sachet containing coffee substance such as described in EP0602203. The device comprises an upper member comprising means intended to perforate the upper surface of the sachet and permit introduction of water into the sachet, a lower member which has a receptacle for accommodation of the capsule and raised and hollow portions; wherein the extraction surface of the sachet is drawn progressively and locally against the raised and hollow portions; the extraction surface tearing in multiple locations according to a path which is predetermined by the location of the raised and hollow portions and reaching its rupture tension there, in order to permit the flow of the liquid after extraction. The lower portion generally comprises flow apertures to permit the beverage to flow there-through. The raised and hollow portions are preferably under the form of truncated pyramids separated by a network of channels.

Hence, handy prior art beverage extraction systems utilize an exchangeable capsule, e.g. rigid capsule, sachet or flexible pod, comprising a tearable beverage outlet membrane, e.g. a thin aluminium foil, which can be torn only when a sufficient deformation of this membrane has occurred against the raised elements of the tearing plate. The tearing generally occurs at the edges of the raised elements which are generally multiple small truncated pyramids or rectilinear ridges. The tearing results in the creation of small orifices along the edges of these raised elements. These orifices are relatively small (e.g. 0.1-1.0 mm long and 0.1-0.3 mm wide) and generally the outlet membrane at least partially conforms to the top and upper side of the raised elements so reducing even more the flow opening area. As a result, the pressure drop is relatively high at this interface. Furthermore, filtering of the coffee particle occurs at this confined interface which is an advantage since no additional filter is necessary inside the capsule. This geometry of extraction therefore corresponds to what can be generally called a geometry of an extraction plate with raised elements in the present application. The flow of beverage is then collected in the channels and drained through small openings of well-defined dimensions in the channels.

In the known system of the prior art, the flow rate and pressure are dictated by the intrinsic properties of the capsule and by the performance of the pump.

The backpressure highly depends on the degree of compaction of the ground coffee in the capsule. For a same coffee blend, the variability of pressure can be very high. In particular, for certain coffee blends, in particular, in the low particle size, the pressure may vary from 5 to 15 bar.

Whereas the ingredient extraction space, e.g. with a capsule and/or an extraction chamber is usually symmetrical along the general flow direction, enabling easy handling of the ingredient, it may be advantageous to obtain a different flow path at extraction that is such as to obtain or increase certain extraction effects, e.g. crema formation or intensity of the extraction.

SUMMARY OF THE INVENTION

The invention relates to a machine for preparing a beverage. The beverage preparation machine can be an in-home or out of home machine. The machine may be for the preparation of coffee, tea, chocolate, cacao, milk, soup, baby food, etc. . . .

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluent liquid, e.g. water, may be mixed with such ingredient to form the beverage.

Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . In particular, a coffee machine may be configured for dispensing espressos, e.g. an adjustable volume of 20 to 60 ml per portion, and/or for dispensing lungos, e.g. a volume in the range of 70 to 150 ml per portion.

The invention relates to a machine for preparing a beverage from an ingredient contained within a capsule that is provided with an outlet membrane.

The capsule can be of the type described above under the title "Field of the Invention" and/or the capsule may include an ingredient described under the same title.

The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food.

The machine includes an extraction unit that has a capsule extraction seat, an inlet arrangement for guiding water into the seat and a dispensing arrangement for guiding beverage out of the seat.

Examples of ingredient extraction seats, e.g. extraction chambers, are disclosed in EP 1767129, WO 2008/037642, WO 2012/025258, WO 2012/025259, WO 2013/026843, WO 2013/127476, WO 2014/056641, WO 2014/096122, WO 2014/096123, WO 2015/155144 and WO 2015/155145.

The dispensing arrangement has a face delimiting a downstream part of the seat. The face bears one or more raised elements that project upstream and that are configured for forming one or more beverage outlet openings in the outlet membrane of the capsule in the seat, the raised element(s) being fixed relative to and/or integral with the face and comprising at least one controllable raised element.

The formation of such beverage outlet opening(s) is typically achieved by cutting, tearing and/or breaking the outlet membrane by the raised element(s).

Typically, the dispensing arrangement can have a wall forming the face.

The face can be, at least approximately, disc shaped.

The dispensing arrangement typically leads to a beverage dispensing area, for instance via this face or by bypassing this face.

The machine may have a drop stop arrangement between the seat and the beverage dispensing area. Examples of drop stops are disclosed in WO 2006/050769, WO 2012/072758, WO 2013/127907, WO 2016/050657, WO 2016/083488, WO 2018/069266 and EP2017208722.3.

The dispensing area may be delimited by a support for supporting a user-recipient, e.g. a cup or mug. For instance, the support is a support device that is connected an outside machine housing and/or a machine frame, or the support device is external to such machine, for example the machine itself is placed for dispensing the beverage. Typically, the external support device has a generally horizontal surface for placing such machine, the device being for instance a table or a shelf.

The user-recipient support can be: associated with a drip tray e.g. a drip tray supporting the support; and/or movable relative to the housing vertically under the outlet and/or away from under a dispensing outlet for enabling a placement of user-recipients of different heights under the outlet.

Examples of suitable recipient supports are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, EP 2014198710, EP 2014198712 and EP 2014198715.

The face is associated with an opening control arrangement configured to control the formation of the outlet opening(s) in the outlet membrane by the abovementioned at least one controllable raised element.

The opening control arrangement includes at least one neutralizing member that is movable adjacent the controllable raised element between an operative position in which the controllable raised element is prevented from forming a beverage outlet opening in the outlet membrane and a rest position in which the controllable raised element is enabled to form a beverage outlet opening in the outlet membrane.

Such controllable raised element may project upstream from the face along an opening direction, the neutralizing member being movable between its operating and rest positions: at least approximately in parallel to the opening direction; and/or transversally to the piercing direction.

It follows that the seat may be associated with a plurality of raised elements at least some of which, i.e. the controllable raised element(s), may be neutralized, if desired, during part or all of an extraction of a capsule, to not form corresponding openings in the outlet membrane. Thereby, the properties of the flow and/or pressure to which the ingredient in the capsule is subjected during extraction and thus the properties of the extracted beverage can be adjusted.

The neutralizing member may have a concave portion with an edge that extends at least around part of such controllable raised element, the edge forming a closed or open loop, such as a substantially polygonal, e.g. square or rectangular loop, and/or a round or rounded loop.

The neutralizing member can have a convex portion with an edge that extends on a side of the at least one controllable raised element, the edge being straight or curved.

The neutralizing member may have an upstream surface that is oriented to substantially face the outlet membrane of the capsule when located in the seat. For instance, the controllable raised element projects upstream from the face along an opening direction, the upstream surface extending transversally, e.g. substantially orthogonally, to the opening direction.

The upstream surface can be planar and/or rounded.

When the neutralizing member is in its operative position, the upstream surface can be located: substantially adjacent to an opening extremity of the abovementioned controllable raised element; or in the seat deployed away from the face beyond the abovementioned controllable raised element. Thus, the outlet membrane may be kept by the neutralizing member from being opened by the corresponding controllable raised element.

When the neutralizing member is in its operative position, the upstream surface can be urged against the outlet membrane of the capsule when located in the seat. Thus, the outlet membrane may be urged away from the corresponding controllable raised element.

The neutralizing member can be located in its rest position at or against the face adjacent a bottom end of the controllable raised element.

The neutralizing member may be driven by a connecting member, the connecting member being actuated manually and/or automatically, such as by a spring actuator and/or an electric actuator e.g. an electric motor. Optionally, the connecting member extends though the face, e.g. the connecting member being actuated from behind the face.

When the face bears a plurality of such raised elements, only some of the elements may be controllable raised element(s) that are adjacent the neutralizing member(s) movable to enable or prevent formation of beverage outlet opening(s) in the outlet membrane by the controllable raised element(s). The face can have a ratio of a number of controllable raised element(s) over a total number of raised elements in the range of 0.2 to 0.9, such as 0.25 to 0.8, for instance 0.33 to 0.70, e.g. 0.4 to 0.6.

The controllable raised element(s) may be arranged to form an uppermost or a lowermost portion of the raised elements at the face.

When the face bears a plurality of such raised elements, all of the elements may be controllable raised elements, the opening control arrangement comprising a plurality of neutralizing members that are movable independently from one another.

When the face bears a plurality of such raised elements, the or at least one of the neutralizing members can be configured to enable or prevent formation of beverage outlet openings in the outlet membrane by a plurality of controllable raised elements, such as a number of controllable raised elements in the range of 2 to 25, for instance 3 to 20, for example 4 to 15, e.g. 5 to 10.

Such neutralizing member may form a substantially circular or annular sector, e.g. generally half disc, such as a substantially circular or annular sector having a circle centre that is at least approximately concentric with a face's circular shape. For instance, the substantially circular or annular sector extends to a circular edge of the face's circular shape. The substantially circular or annular sector may have a central angle in the range of 60 to 300°, such as 90 to 270°, for example 120 to 240°, e.g. 150 to 210°.

The controllable raised elements may form a portion in a shape of a substantial disc segment. The substantial disc segment may have a disc centre that is at least approximately concentric with a face's shape.

The machine may be configured to maintain at least one movable neutralizing member stationary relatively to the face from a beginning to an end of an extraction of the capsule in the capsule extraction seat.

The machine can be configured to move at least one movable neutralizing member relatively to the face during an extraction of the capsule in the capsule extraction seat. For instance, the at least one movable neutralizing member is arranged to be in the operative position to prevent a formation of corresponding beverage outlet opening(s) during an initial period of extraction of the capsule and then to be moved into the rest position to enable a formation of one or more corresponding beverage outlet opening(s) in the capsule's outlet membrane so as to enable an outflow of beverage therefrom during a subsequent period of extraction.

The movable neutralizing member can be configured to selectively prevent and enable a number of controllable raised elements from forming beverage outlet openings in the outlet member, the face having a ratio of the number of controllable raised elements over a total number of raised elements in the range of 0.20 to 0.85, such as 0.25 to 0.75, for instance 0.33 to 0.66, e.g. 0.4 to 0.6.

The opening arrangement may include a or the above mentioned plurality of neutralizing members configured to selectively prevent and enable a number of controllable raised elements from forming beverage outlet openings in the outlet member, the face having a ratio of the number of controllable raised elements over a total number of raised elements in the range of 0.20 to 1, such as 0.25 to 0.75, for instance 0.33 to 0.66, e.g. 0.4 to 0.6. Each neutralizing member can be individually movable.

The opening control arrangement may include a pressurizer, such as a liquid driver e.g. a pump, configured for driving a carrier liquid, such as water, along the inlet arrangement so as to raise a pressure, e.g. in the range of 5 to 20 bar such as 8 to 15 bar, inside the capsule when in the seat and urge the capsule's outlet membrane towards the raised element(s) so as to form the beverage outlet opening(s) in the outlet membrane when the corresponding neutralizing member(s) is/are in the rest position.

The opening control arrangement may include an actuator for mechanically urging the capsule against the face whereby the capsule's outlet membrane is urged towards the raised element(s) so as to form the beverage outlet opening(s) in the outlet membrane when the corresponding neutralizing member(s) is/are in the rest position.

Self-opening capsules are for instance disclosed in CH 605 293 and WO 03/059778.

The opening of capsules by a machine's piercing elements of a plate is for example disclosed in EP 512 470 and EP 2 068 684.

The face can be formed by a plate-like or sheet-like member, e.g. a disk-like member, and/or by a member having a flow-through configuration e.g. a configuration comprising at least one of: one or more flow-through holes such as (a) flow-through hole(s) extending from adjacent raised element(s); a reticulated structure; a foraminate structure; and a porous structure. For instance, the configuration comprises a number of flow-through holes:
  in the range of 5 to 15, such as 7 to 13, e.g. 9 to 12; and/or
  each through hole having a minimum diameter transverse to a beverage outflow direction along the hole, in the range of about 0.1 to 1 mm, such as 0.3 to 0.8 mm, e.g. 0.4 to 0.6 mm.

The capsule extraction seat can be delimited by a first part and a second part that are relatively movable between: an open position for inserting the ingredient capsule into the extraction seat and/or for removing such capsule from the seat; and a closed position for extracting in the seat the ingredient capsule.

When closed capsules are used, the first and second parts may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein.

The first and second parts can be relatively movable by an actuator such as by a user-handle or by an electric motor, e.g. an actuator connected to at least one of the first and second parts by a transmission such as one or more of gears, belts, cams and cam-followers, levers and/or hydraulic transmissions. For instance, such electric motor is controlled by a control unit for controlling the water supply arrangement, such as a unit comprising a processing device e.g. a controller and/or a user interface.

Examples of motors implemented to actuate such first and second parts are disclose in EP 1767129, WO 2012/025258, WO 2012/025259, WO 2013/127476, WO 2014/056641, WO 2014/096122, WO 2014/096123, WO 2015/155144 and WO 2015/155145.

The first part may bear the face and the second part may bear the inlet arrangement.

One of the first and second parts can be stationary relative to an outside machine housing and the other of the first and second parts may be movable relative to the outside machine housing.

Examples of suitable first and second part arrangements are disclosed in WO 2005/004683, WO2007/135136, WO 2009/043630, WO 2017/037212, WO 2017/037215, PCT/EP18/064138 and PCT/EP18/064141.

The inlet arrangement can be associated with a piercing or cutting arrangement configured to pierce or cut water inlet opening(s) into the ingredient capsule in the ingredient extraction seat so that water circulating along the inlet arrangement is passed into the capsule via the water inlet opening.

The inlet arrangement may be fluidically connected to a water supply arrangement via a water guide.

The water supply arrangement may include at least one of: a water source for supplying water to the inlet arrangement, such as a water tank and/or a connector to an external water supply line; a water driver for driving water to the inlet arrangement, such as a pump; and a thermal conditioner, e.g. a heater and/or a cooler, for thermally conditioning water supplied or to be supplied to the inlet arrangement, such as a water flow thermal conditioner or a water accumulator thermal conditioner.

The thermal conditioner may be a boiler or a thermoblock or an on demand heater (ODH), for instance an ODH type disclosed in EP 1 253 844, EP 1 380 243 and EP 1 809 151.

Examples of pumps and their incorporation into beverage machines are disclosed in WO 2009/150030, WO 2010/108700, WO 2011/107574 and WO 2013/098173.

The water supply arrangement can be associated with a or the control unit for controlling the water supply arrangement, such as a unit having a processing device e.g. a controller and/or a user interface.

The capsule extraction seat may be associated with an un-extracted ingredient capsule insertion passage, e.g. extending from outside such machine, and/or an extracted ingredient capsule evacuation passage, e.g. towards a waste capsule collector. For instance, at least one of the passages is associated with: guides such as rails or grooves, for cooperating with and guiding the capsule along the passage to and/or from the seat; and/or with a stop for immobilizing the capsule at about a level of the seat.

Examples of waste ingredient collectors are disclosed in EP 1867260, WO 2009/074559, WO 2009/135869, WO 2010/128109, WO 2011/086087, WO 2011/086088, WO 2017/118713, WO 2017/148965 and EP 2018156589.

The interaction between the first and second parts (and optionally the insertion and/or evacuation passage) and an ingredient capsule may be of the type disclosed in WO 2005/004683, WO 2007/135135, WO2007/135136, WO 2008/037642 and WO 2013/026856.

The insertion passage, when present, may be associated with an ingredient barrier, such as a gate or door or hatch, for selectively allowing and preventing an ingredient pass along the passage. Details of suitable barriers for an ingredient, such as an ingredient supplied within a capsule, are disclosed in WO 2012/126971, WO 2014/056641, WO 2014/056642 and WO 2015/086371.

The control unit can comprise an ingredient sensor such as an ingredient capsule sensor.

Details of suitable capsule sensors are disclosed in WO 2012/123440, WO 2014/147128, WO 2015/173285, WO 2015/173289, WO 2015/173292, WO 2016/005352, WO 2016/005417, PCT/EP18/065613, EP3275345 and EP3275346.

The control unit may incorporate a user-interface, such as a user-interface connected to a or the above control circuit. The user-interface may be of the known type, e.g. as disclosed in WO 2010/037806, WO 2011/020779, WO 2016/083485, WO 2017/037215 and PCT/EP18/064138.

The control unit can have a sensor for sensing a presence of a user-recipient, e.g. a cup or mug, in a or the above area to which beverage from the beverage processing line is dispensed. Such a configuration is for instance disclosed in WO 2018/046400.

The invention also concerns a use of an ingredient capsule, for extraction in a machine as described above.

The pressure is typically measured downstream a pump and upstream the water inlet, e.g. in the fluid line between the water inlet and the pump. The pressure in the extraction chamber or in the capsule may possibly be reduced compared to such measured pressure by the presence of a check valve, e.g. at the water inlet of the injection part, and/or restrictions provided in the water inlet of the injection part or by piercing members engaged in the entry wall of the capsule and/or by the ingredient in the capsule and/or other obstacles.

BRIEF DESCRIPTION OF THE DRAWINGS

The invention will now be described with reference to the schematic drawings, wherein.

DETAILED DESCRIPTION

Figure 1:
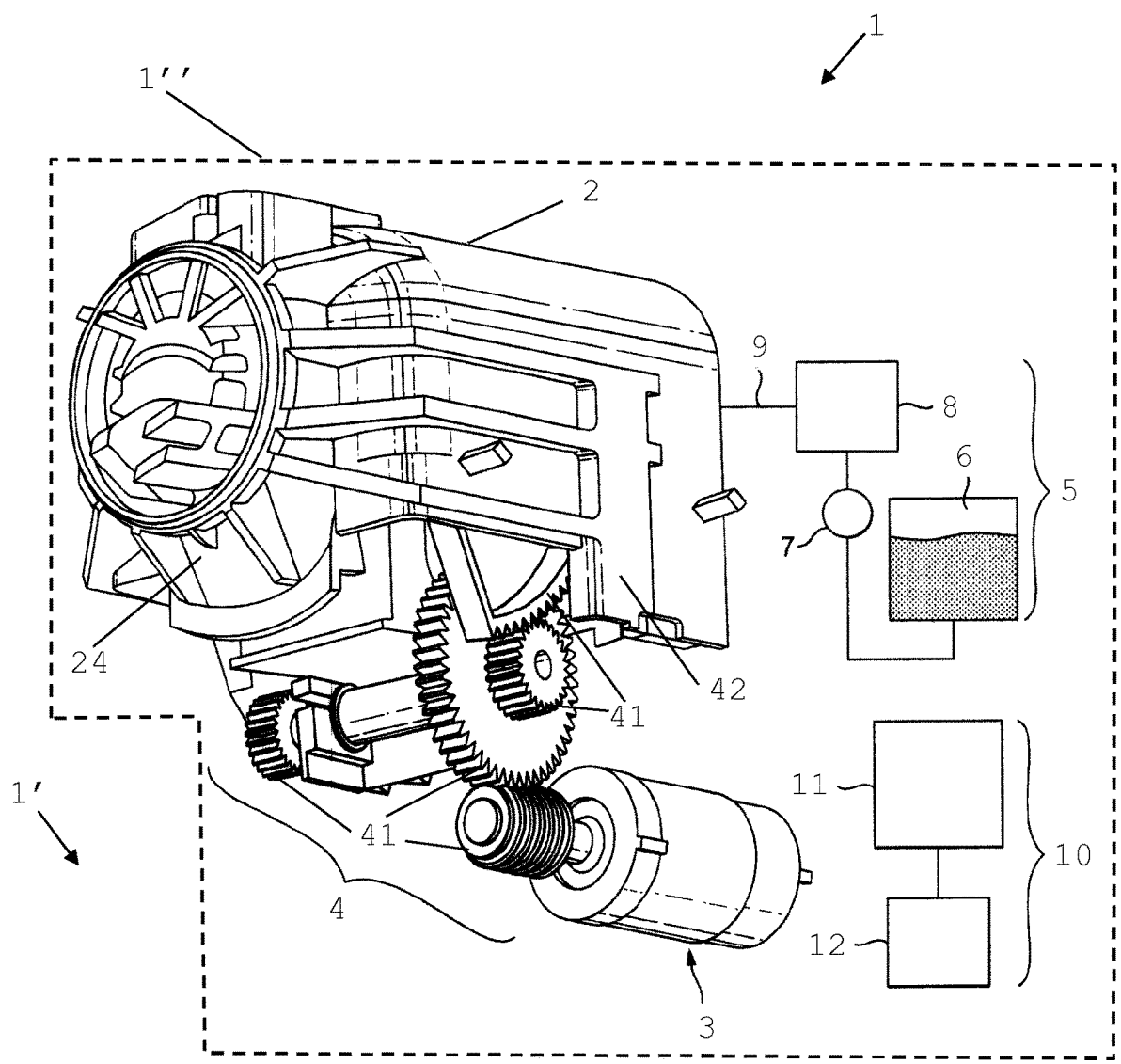
FIG. 1 shows an example of part of a beverage machine according to the invention, part of which being schematically illustrated.
Figure 2:
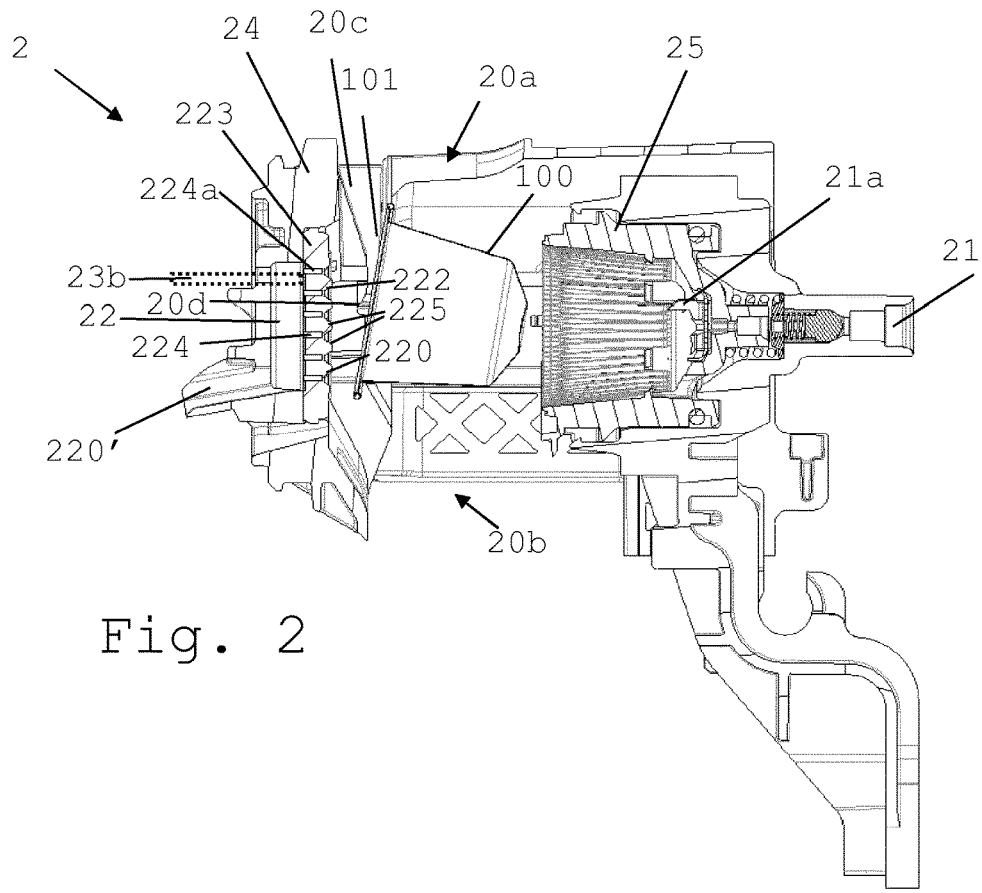
FIG. 2 is a cross-sectional view of an extraction unit of the machine of FIG. 1, an ingredient capsule being in the process of being introduced into the unit's seat.
Figure 3:
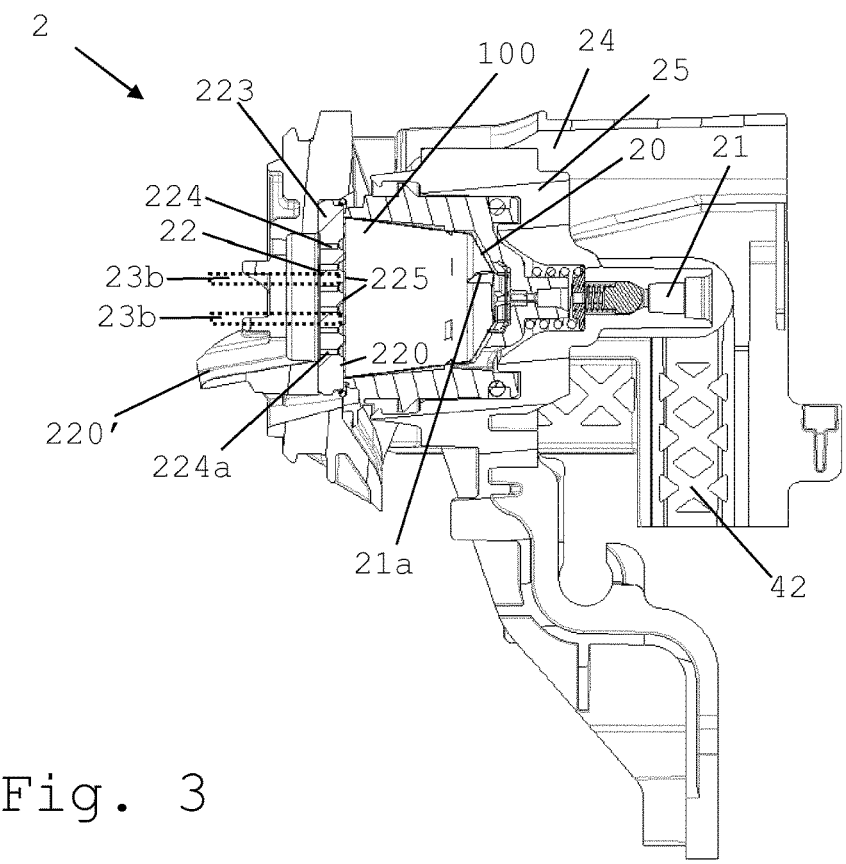
FIG. 3 is a cross-section view of the extraction unit of FIG. 2 with a variation, the ingredient capsule being housed in the seat, ready for extraction.

FIGS. 1 to 7 illustrate an exemplary embodiment and variations and parts thereof of a beverage machine 1 for preparing a beverage from an ingredient supplied within a capsule 100 that is provided with an outlet membrane 101, according to the invention.

Machine has an extraction unit 2 that has a capsule extraction seat 20, an inlet arrangement 21 for guiding water into seat 20 and a dispensing arrangement 22 for guiding beverage out of seat 20. Dispensing arrangement 22 has a face 220 delimiting a downstream part of seat 20. Face 220 bears one or more raised elements 225 that project upstream and that are configured for forming one or more beverage outlet openings in outlet membrane 101 of capsule 100 in seat 20. Raised element(s) 225 are fixed relative to and/or integral with face 220 and include at least one controllable raised element 225*a*. Face 220 are associated with an opening control arrangement 23 configured to control the formation of the outlet opening(s) in outlet membrane 101 by such controllable raised element 225a. See FIGS. 1 to 3.

Figure 4:
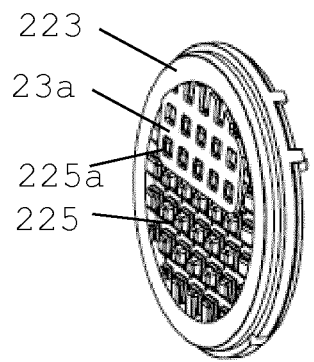
FIGS. 4 to 5*a* illustrate an embodiment of a member defining a face of a dispensing arrangement with a movable neutralizing member of a machine according to the invention.
Figure 4A:
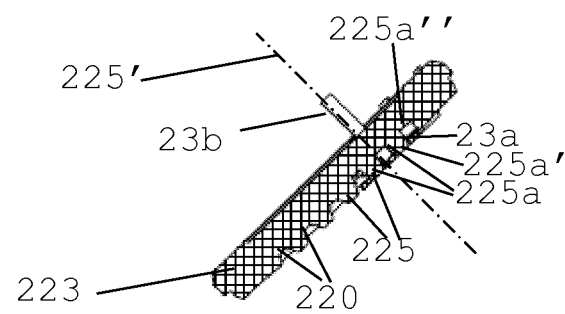
Figure 5:
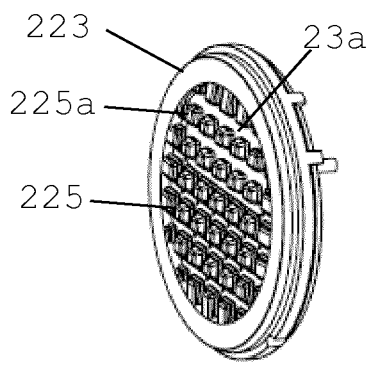
Figure 5A:
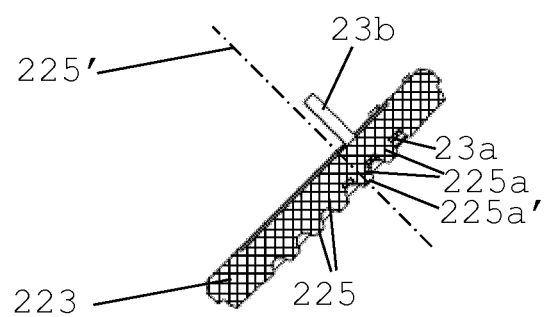
Figure 6:
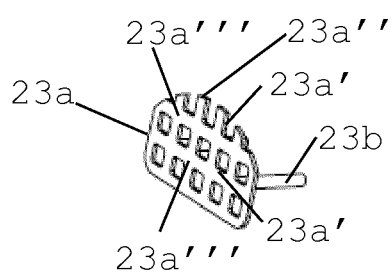
FIGS. 6 and 7 are perspective views of the neutralizing member shown in FIGS. 4 to 5*a*.
Figure 7:
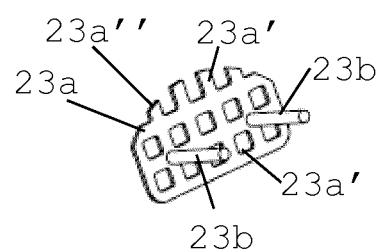

Opening control arrangement 23 has at least one neutralizing member 23a (FIGS. 6 and 7) that is movable adjacent controllable raised element 225a between an operative position (FIGS. 4 and 4a) in which controllable raised element 225a is prevented from forming a beverage outlet opening in the outlet membrane 101 and a rest position (FIGS. 5 and 5a) in which controllable raised element 225a is enabled to form a beverage outlet opening in outlet membrane 101.

Such controllable raised element 225a may project upstream from face 220 along an opening direction 225', neutralizing member 23a being movable between its operating and rest positions: at least approximately in parallel to the opening direction 225'; and/or transversally to the piercing direction. See FIGS. 2 to 5a.

Neutralizing member 23a can have a concave portion with an edge 23a' that extends at least around part of controllable raised element 225a, edge 23a' forming a closed or open loop, such as a substantially polygonal, e.g. square or rectangular loop, and/or a round or rounded loop. See FIGS. 4 to 7.

Neutralizing member 23a may have a convex portion with an edge 23a'' that extends on a side of controllable raised element 225a, edge 23a'' being straight or curved. See FIGS. 4 to 7.

Neutralizing member 23a may have an upstream surface 23a''' that is oriented to substantially face outlet membrane 101 of capsule 100 when located in seat 20. See FIGS. 2, 3 and 6. Controllable raised element 225a may project upstream from face 220 along an opening direction 225'. Upstream surface 23a''' may extend transversally, e.g. substantially orthogonally, to opening direction 225'. Upstream surface 23a''' may be planar and/or rounded. See FIGS. 4 to 7.

When neutralizing member 23a is in its operative position, the upstream surface 23a''' can be located: substantially adjacent to an opening extremity 225a' of at least one controllable raised element 225a; or in seat deployed away from face 220 beyond at least one controllable raised element 225a. See FIGS. 3, 4 and 4a.

When neutralizing member 23a is in its operative position, upstream surface 23a''' can be urged against outlet membrane 101 of capsule 100 when located in seat 20. See FIGS. 3, 4 and 4a.

Neutralizing member 23a can be located in its rest position at or against face 220 adjacent a bottom end 225a'' of at least one controllable raised element 225a. See FIGS. 5 and 5a.

Neutralizing member 23a may be driven by a connecting member 23b, connecting member 23b being actuated manually and/or automatically, such as by a spring actuator and/or an electric actuator e.g. an electric motor. For instance, connecting member 23b extends though face 220, connecting member 23b may be actuated from behind face 220. See FIGS. 2 to 7.

Face 220 may bear a plurality of raised elements 225. Only some of elements 225 may be controllable raised element(s) 225a that are adjacent neutralizing member(s) 23a movable to enable or prevent formation of beverage outlet opening(s) in outlet membrane 101 by controllable raised element(s) 225a. Face 220 can have a ratio of a number of controllable raised element(s) 225a over a total number of raised elements 225 in the range of 0.2 to 0.9, such as 0.25 to 0.8, for instance 0.33 to 0.70, e.g. 0.4 to 0.6. Controllable raised element(s) 23 may be arranged to form an uppermost or a lowermost portion of raised elements 225 at face 220. See FIGS. 2 and 4 to 7.

Face 220 may bear a plurality of raised elements 225, all of raised elements 225 being controllable raised elements 225a, opening control arrangement 23a having a plurality of neutralizing members 23a that are movable independently from one another. See FIG. 3.

Face 220 may bear a plurality of raised elements 225, the or at least one of neutralizing members 23a being configured to enable or prevent formation of beverage outlet openings in outlet membrane 101 by a plurality of controllable raised elements 225a, such as a number of controllable raised elements 225a in the range of 2 to 25, for instance 3 to 20, for example 4 to 15, e.g. 5 to 10. See FIGS. 2 to 7.

Machine 1 can be configured to maintain at least one movable neutralizing member 23a stationary relatively to face 220 from a beginning to an end of an extraction of capsule 100 in capsule extraction seat 20.

Machine 1 may be configured to move at least one movable neutralizing member 23a relatively to face 220 during an extraction of capsule 100 in capsule extraction seat 20. For instance, neutralizing member 23a can be arranged to be in the operative position to prevent a formation of corresponding beverage outlet opening(s) during an initial period of extraction of capsule 100 and then to be moved into the rest position to enable a formation of one or more corresponding beverage outlet openings in the capsule's outlet membrane 101 so as to enable an outflow of beverage therefrom during a subsequent period of extraction.

Movable neutralizing member 23a may be configured to selectively prevent and enable a number of controllable raised elements 225a from forming beverage outlet openings in outlet member 101, face 220 having a ratio of this number of controllable raised elements 225a over a total number of raised elements 225 in the range of 0.20 to 0.85, such as 0.25 to 0.75, for instance 0.33 to 0.66, e.g. 0.4 to 0.6. See FIGS. 2 and 4 to 7.

The opening control arrangement 23 can include a or the abovementioned plurality of neutralizing members 23a configured to selectively prevent and enable a number of controllable raised elements 225a from forming beverage outlet openings in the outlet member 101, face 220 having a ratio of this number of controllable raised elements 225a over a total number of raised elements 225 in the range of 0.20 to 1, such as 0.25 to 0.75, for instance 0.33 to 0.66, e.g. 0.4 to 0.6. Each neutralizing member 23a can be individually movable (e.g. individually motorized). See FIG. 3.

Opening control arrangement 23 may include a pressurizer, such as a liquid driver e.g. a pump 7, configured for driving a carrier liquid, such as water, along inlet arrangement 21 so as to raise a pressure, e.g. in the range of 5 to 20 bar such as 8 to 15 bar, inside capsule 100 when in seat 20 and urge capsule's outlet membrane 101 towards raised element(s) 225 so as to form the beverage outlet opening(s) in outlet membrane 101 when the corresponding neutralizing member(s) 23a is/are in the rest position. See FIGS. 1, 3, 5 and 5a.

Opening control arrangement 23 may include an actuator for mechanically urging capsule 100 against face 220 whereby capsule's outlet membrane 101 is urged towards raised element(s) 225 so as to form the beverage outlet opening(s) in the outlet membrane 101 when the corresponding neutralizing member(s) 23a is/are in the rest position. See FIGS. 1 to 3, 5 and 5a.

Face 220 may be formed by a plate-like or sheet-like member 223, e.g. a disk-like member, and/or by a member 223 having a flow-through configuration e.g. a configuration comprising at least one of: one or more flow-through holes 224 such as (a) flow-through hole(s) extending from adjacent raised element(s) 225,225a; a reticulated structure; a foraminate structure; and a porous structure. See FIGS. 2 to 5a.

For instance the configuration has a number of flow-through holes 224: in the range of 5 to 15, such as 7 to 13, e.g. 9 to 12; and/or each through hole 224 having a minimum diameter transverse to a beverage outflow direction along the hole, in the range of about 0.1 to 1 mm, such as 0.3 to 0.8 mm, e.g. 0.4 to 0.6 mm. See FIGS. 2 and 3.

Capsule extraction seat 20 can be delimited by a first part 24 and a second part 25 that are relatively movable between: an open position for inserting ingredient capsule 100 into extraction seat 20 and/or for removing such capsule 100 from seat 20; and a closed position for extracting in seat 20 ingredient capsule 100. See FIGS. 1 and 2.

First and second parts 24,25 can be relatively movable by an actuator such as by a user-handle or by an electric motor 3, e.g. an actuator connected to at least one of first and second parts 24,25 by a transmission 4 such as one or more of gears 41, belts, cams 42 and cam-followers, levers and/or hydraulic transmissions. For instance, electric motor 3 is controlled by a control unit 10 for controlling water supply arrangement 5, such as a unit 10 having a processing device e.g. a controller 11 and/or a user interface 12. See FIGS. 1 to 3.

First part 24 may bear face 220 and second part 25 may bear inlet arrangement 21. See FIGS. 2 and 3.

One of first and second parts 24,25 can be stationary relative to an outside machine housing 1" and the other of first and second parts 24,25 can be movable relative to outside machine housing 1". See FIGS. 1 to 3.

Inlet arrangement 21 can be associated with a piercing or cutting arrangement 21a configured to pierce or cut water inlet opening(s) into ingredient capsule 100 in ingredient extraction seat 20 so that water circulating along inlet arrangement 21 is passed into capsule 100 via the water inlet opening.

Inlet arrangement 21 may be fluidically connected to a water supply arrangement 5 via a water guide 9.

Water supply arrangement 5 may have at least one of: a water source 6 for supplying water to inlet arrangement 21, such as a water tank and/or a connector to an external water supply line; a water driver 7 for driving water to the inlet arrangement 21, such as a pump; and a thermal conditioner 8, e.g. a heater and/or a cooler, for thermally conditioning water supplied or to be supplied to inlet arrangement 21, such as a water flow thermal conditioner or a water accumulator thermal conditioner.

Water supply arrangement 5 may be associated with a or the above mentioned control unit 10 for controlling water supply arrangement 5, such as a unit 10 having a processing device e.g. a controller 11 and/or a user interface 12.

Capsule extraction seat 20 may be associated with an un-extracted ingredient capsule insertion passage 20a, e.g. extending from outside such machine, and/or an extracted ingredient capsule evacuation passage 20b, e.g. towards a waste capsule collector. For instance, at least one of passages 20a, 20b is associated with:
- guides 20c such as rails or grooves, for cooperating with and guiding capsule 100 along the passage to and/or from seat 20; and/or
- a stop 20d for immobilizing capsule 100 at about a level of the seat 20.

The invention claimed is:

1. A machine for preparing a beverage from an ingredient supplied within a capsule that is provided with an outlet membrane, the machine comprising:
   an extraction unit that has a capsule extraction seat, an inlet arrangement configured for guiding water into the capsule extraction seat, and a dispensing arrangement configured for guiding beverage out of the capsule extraction seat, the dispensing arrangement comprising a face delimiting a downstream part of the capsule extraction seat, the face bearing one or more raised elements that project upstream, the one or more raised elements being configured for forming one or more beverage outlet openings in the outlet membrane of the capsule in the capsule extraction seat, the one or more raised elements having a configuration selected from the group consisting of being fixed relative to, being integral with the face, and combinations thereof, the one or more raised elements comprising at least one controllable raised element, the face being associated with an opening control arrangement configured to control a formation of the one or more beverage outlet openings in the outlet membrane by the at least one controllable raised element; and
   the opening control arrangement comprises at least one neutralizing member that is movable adjacent the at least one controllable raised element, the at least one neutralizing member being movable between an operative position in which the at least one controllable raised element is prevented from forming a beverage outlet opening in the outlet membrane and a rest position in which the at least one controllable raised element is enabled to form a beverage outlet opening in the outlet membrane.

2. The machine of claim 1, wherein the neutralizing member has at least one of:
   a concave portion with a concave portion edge that extends at least around a part of the at least one controllable raised element, the concave portion edge forming a closed or open loop; or
   a convex portion with a convex portion edge that extends on a side of the at least one controllable raised element, the convex portion edge being straight or curved.

3. The machine of claim 1, wherein the neutralizing member has an upstream surface that is oriented to face the outlet membrane of the capsule when the capsule is located in the capsule extraction seat.

4. The machine of claim 3, wherein, when the neutralizing member is in the operative position, the upstream surface has at least one location selected from the group consisting of adjacent to an opening extremity of the at least one controllable raised element, in the capsule extraction seat deployed away from the face beyond the at least one controllable raised element and urged against the outlet membrane of the capsule when the capsule is located in the capsule extraction seat.

5. The machine of claim 1, wherein the neutralizing member has at least one configuration selected from the group consisting of being located in the rest position at or against the face adjacent a bottom end of the at least one controllable raised element or driven by a connecting member, the connecting member having a configuration selected from the group consisting of being actuated manually, being actuated automatically, or combinations thereof.

6. The machine of claim 1, wherein the one or more raised elements includes a plurality of the raised elements, and wherein the machine has at least one configuration selected from the group of: less than all of the plurality of the raised elements include a plurality of controllable raised elements, the plurality of controllable raised elements are adjacent the at least one neutralizing member movable to enable or prevent formation of the beverage outlet openings in the outlet membrane by the plurality of the controllable raised elements, all of the plurality of the raised elements are controllable raised elements, the opening control arrangement comprising a plurality of neutralizing members that are movable independently from one another, or the at least one neutralizing member is configured to enable or prevent formation of beverage outlet openings in the outlet membrane by a plurality of controllable raised elements.

7. The machine of claim 1, wherein the machine is configured to perform an action selected from the group of:
   maintain the at least one neutralizing member stationary relatively to the face from a beginning to an end of an extraction of the capsule in the capsule extraction seat; or
   move the at least one neutralizing member relatively to the face during an extraction of the capsule in the capsule extraction seat.

8. The machine of claim 1, wherein the at least one neutralizing member is configured to selectively prevent and enable a number of controllable raised elements from forming beverage outlet openings in the outlet member, the face having a ratio of the number of controllable raised elements to a total number of raised elements in the range of 0.20 to 0.85.

9. The machine of claim 1, wherein the opening control arrangement comprises the at least one neutralizing member configured to selectively prevent and enable a number of controllable raised elements from forming beverage outlet openings in the outlet member, the face having a ratio of the number of controllable raised elements to a total number of raised elements in the range of 0.20 to 1.

10. The machine of claim 1, wherein the opening control arrangement comprises a component selected from the group consisting of:
    a pressurizer configured for driving a carrier liquid along the inlet arrangement to raise a pressure inside the capsule when the capsule is in the capsule extraction seat and to urge the outlet membrane of the capsule towards the one or more raised elements to form the one or more beverage outlet openings in the outlet membrane when the at least one neutralizing member is in the rest position; or
    an actuator configured for mechanically urging the capsule against the face whereby the outlet membrane of the capsule is urged towards the one or more raised elements to form the one or more beverage outlet openings in the outlet membrane when the at least one neutralizing member is in the rest position.

11. The machine of claim 1, wherein the face is formed by a plate-like or sheet-like member.

12. The machine of claim 1, wherein the capsule extraction seat is delimited by a first part and a second part that are relatively movable between:
    an open position configured for a configuration selected from the group consisting of inserting the capsule into the capsule extraction seat, removing the capsule from the capsule extraction seat, or combinations thereof; and
    a closed position for extracting the capsule in the capsule extraction seat.

13. The machine of claim 1, wherein the inlet arrangement has a configuration selected from the group of:
    associated with a piercing or cutting arrangement configured to pierce or cut a water inlet opening into the capsule in the capsule extraction seat so that water circulating along the inlet arrangement is passed into the capsule via the water inlet opening; or
    fluidly connected to a water supply arrangement via a water guide.

14. The machine of claim 1, wherein the capsule extraction seat is associated with an un-extracted ingredient capsule insertion passage.

15. The machine of claim 14, wherein the un-extracted ingredient capsule insertion passage being associated with guides configured for cooperating with and guiding the capsule along the un-extracted ingredient capsule insertion passage to or from the capsule extraction seat.

16. The machine of claim 14, wherein the un-extracted ingredient capsule insertion passage being associated with a stop for immobilizing the capsule at about a level of the capsule extraction seat.

* * * * *